United States Patent [19]

North et al.

[11] Patent Number: 5,992,888
[45] Date of Patent: Nov. 30, 1999

[54] ADVERTISING DEVICE AND METHOD FOR USE AT POINT OF SALE

[75] Inventors: Vaughn W. North, 8180 S. 700 East, Sandy, Utah 84091; Kent R. Johnson; G. O'Brien Garrett, both of Sandy, Utah

[73] Assignee: Vaughn W. North, Sandy, Utah

[21] Appl. No.: 09/007,945

[22] Filed: Jan. 16, 1998

[51] Int. Cl.[6] .............................. G09F 3/18; G06F 17/48
[52] U.S. Cl. ........................ 283/56; 235/375; 235/383; 283/56; 283/57; 705/14; 705/40
[58] Field of Search ................................... 235/375, 383; 283/56, 57; 705/14, 40

[56] References Cited

U.S. PATENT DOCUMENTS

| | | | |
|---|---|---|---|
| 4,559,727 | 12/1985 | Lewyt | ..................................... 283/56 |
| 4,643,455 | 2/1987 | North et al. | . |
| 5,531,482 | 7/1996 | Blank | . |
| 5,809,481 | 9/1998 | Baron et al. | ............................. 705/14 |

OTHER PUBLICATIONS

Lisa Troshinsky, "*U.S. Government to Introduce Navy, Western Health Multi–Application Card*" Telecommunications Reports International, Inc., pp. 1–5.

*Primary Examiner*—Willmon Fridie, Jr.
*Assistant Examiner*—Mark T. Henderson
*Attorney, Agent, or Firm*—Thorpe North & Western

[57] ABSTRACT

A device and method for displaying advertising materials to a potential purchaser coincident with the making of a financial transaction by the purchaser. The device comprises at least one transaction recording card sized to attach to and conform to dimensions of a standard credit or debit card and includes a format for making a record of a transaction associated with the purchaser. Third party advertising material is placed on the recording card in a format which may be viewed by the purchaser at a time and place of making the record of the transaction. The method comprises the steps of a) identifying a group of purchasers having a common interest in a particular market; b) selecting a group of businesses which desire to access the group of purchasers for third party advertising purposes; c) producing at least one transaction recording card having a format for making a record of a financial transaction associated with the purchaser; d) placing the advertising material on the recording card in a format which may be viewed by the purchaser at a time and place of making the record of the financial transaction, and e) providing means for attachment of the transaction recording card and associated advertising material to a financial transaction card which can be carried in a wallet of the purchaser.

28 Claims, 7 Drawing Sheets

Vehicle Maintenance Record

| Notes | |
|---|---|

Purchase of Gas

| Date | Gal | Cost | Miles | Notes |
|---|---|---|---|---|
| | | | | |
| | | | | |
| | | | | |
| | | | | |
| | | | | |

*Fig. 7*

Notes on Equipment Use

| Notes | |
|---|---|

Rental Transactions

| Date | Equipment | Cost | Notes | Due Date |
|---|---|---|---|---|
| | | | | |
| | | | | |
| | | | | |
| | | | | |

| Medical Record | |
|---|---|
| Notes | Prescriptions |
|  |  |
|  |  |
|  |  |
|  |  |
|  |  |

50a — Notes column
50b — Prescriptions column
15 — dashed line separator

Office Calls

| Date | Doctor | Cost | Notes |
|---|---|---|---|
|  |  |  |  |
|  |  |  |  |
|  |  |  |  |
|  |  |  |  |
|  |  |  |  |

| | Things to Do | Priority |
|---|---|---|
| Notes |  |  |
|  |  |  |
|  |  |  |
|  |  |  |
|  |  |  |
|  |  |  |

60
15

Purchase 5 Services/Rec Free...

| Date | Service | Cost | Notes |
|---|---|---|---|
|  |  |  |  |
|  |  |  |  |
|  |  |  |  |
|  |  |  |  |
|  |  |  |  |

ADVERTISING DEVICE AND METHOD FOR USE AT POINT OF SALE

BACKGROUND OF THE INVENTION

1. Field of the Invention

The present invention relates to methods of advertising on behalf of third party businesses to potential customers. More particularly, the present invention pertains to display of advertising materials to potential customers wherein the display of advertising materials is coincident with the occurrence of a purchase transaction by the potential customer.

2. Prior Art

Consumer purchasing within the United States extends into the trillions of dollars annually. Much of this commercial activity is a by-product of massive advertising efforts whose annual cost reaches well into the high billions of dollars. Although much of the advertising expenditure is intended to educate the public on benefits of a given product or service, a major objective of advertising generally is to develop name recognition. A high level of name exposure tends to create a sense of security on the part of the consumer, favoring purchase of products bearing the familiar name as compared to similar products from a company without name recognition. Therefore, companies spend large sums of money simply to have their company or product name in high visibility before their potential customer base.

Although advertising is often viewed as a form of art expressed on billboards, radio and television commercials and printed promotions, statistical studies are developing a scientific aspect to evaluation of advertising materials. Indeed, billions of dollars are invested annually in studies for determining which factors are most persuasive with respect to specific product categories and particular consumer personalities. These studies confirm that certain colors, sounds, print styles, subject content, shapes, and numerous other elements can be selected to develop a more predictable response with respect to a statistical base of potential consumers. Even time of day can be a significant factor in optimizing mental and emotional receptivity with respect to certain products and services.

A significant influence on developing effective advertising is coordination of state of mind and awareness levels with timing of consumer exposure to company and product names. For example, audio and visual promotions are often played within a store where consumers are in a selection process for products under numerous brand names. The high level of awareness and attention of the mind when involved in the decision process enhances the susceptibility to direct and indirect influence of advertising messages. Therefore, an audio jingle or broadcast sale promotion tends to sway purchasing decisions when the consumer is involved in the decision process. Aisle advertising is very popular because it places promotion materials directly in front of the customer at the very point of making a purchase decision.

Other circumstances also tend to stimulate increased consumer attention to product source and identity issues. For example, point of purchase and cash register display advertising catches a consumer when they are in the very act of paying for a product or service. At this stage, the customer has made a purchase decision, including selection of a specific brand or company product. The act of payment operates to place value on the decision (including the company name or brand), and is typically reinforcing a frame of mind in which the consumer is reviewing the benefits of the purchase. It naturally follows that the point of purchase enhances sensitivity to advertising influence. This higher level of awareness would apply whether cash or a credit card is exchanged to consummate the purchase transaction. The point of purchase is therefore an ideal advertising opportunity which arises at the very point of payment for a product or service. Advertising in this circumstance has been limited, however, because the practicality of placing advertising on currency or accessing the customer's private credit or debit cards as a general advertising medium has been unavailable.

This is not to say that the value of name recognition on a credit card has been unappreciated. Visa, Master Card and Discovery are internationally recognized credit card systems. Indeed, the total dollar volume for credit transactions using credit and debit cards exceeded 1.5 trillion dollars in 1997. This doesn't include cash cards, smart cards, gas cards, phone cards and numerous other financial transaction cards that can be used as a substitute for cash payment in a purchase transaction. Consumer sensitivity to brand names on such credit cards is high because each use of the card requires identification of the supporting system—Visa, MasterCard, Discovery, etc. Competition among these systems has also led to high cost competitive advertising in this financial arena. By sharing revenues with other organizations and businesses, co-branding activities have led to credit cards bearing trademarks of other companies having an apparent capacity as a credit card sponsor or supplier. Even charitable organizations have participated in use of co-branded cards which bear the name of the organization.

Nevertheless, such cards for use as cash substitutes in financial transactions (referred to hereafter as "financial transaction cards") have not been used as a medium for carrying general advertising materials. Company name and brand recognition has been limited to identification of the supplying organization of the cards, as opposed to third party business—meaning businesses that have no ownership or supply function with respect to the card. Therefore, the perception of company names on financial transaction cards remains one of supplier identification as with any product or service, and not one of general advertising.

The use of financial transaction cards has become commonplace in virtually every aspect of consumerism. This liberal use has been fostered by a general acceptance of credit shopping as a way of life. It is clear that casual use of credit cards has promoted excessive debt load because typical consumers do not maintain an accurate account of credit card expenses. Most users simply rely on a monthly billing summary from the credit card supplier.

U.S. Pat. No. 4,643,455 represents a solution developed by one of the present inventors for recording transactions using such financial transaction cards. It comprised a transaction recording card which can be attached directly to the credit card. As a purchase is made, the purchasing party removes the recording card and enters transaction data associated with the purchase. Regular use of this device enables a consumer to maintain an on-going balance and thereby curb excessive spending. With the advent of debit cards which operate against a cash balance, such monitoring of purchases becomes even more significant.

Despite growing credit/debit card use over the past decade since issuance of the referenced patent, the present inventors are aware of no device which has been commercially marketed for attachment to the card for maintaining an active record of financial transactions. Those skilled in the art have relied on computer software or a checkbook register maintained separate from the credit/debit card to keep any record of purchases. The traditional paradigm of the credit/debit card performing a single function for financial transactions, without other forms of commercial advantage, continues to dominate related technology. Specifically, the development of a transaction recording device for use with credit/debit cards has provided no assistance to enhancement of current advertising methods. Indeed, the phenomenal surge of credit/debit card use over the past twenty years has failed to develop a perception that financial transaction cards such as credit or debit cards offer an advertising medium or opportunity for third party businesses.

OBJECTS AND SUMMARY OF THE INVENTION

It is therefore an object of the present invention to expand point of sale advertising.

It is a further object of this invention to facilitate coupling of advertising materials to financial transactions at the very moment of purchase.

An additional object of the present invention is to provide an additional utility to financial transaction cards such as debit and credit cards in the form of a general advertising medium which is independent and separable from the transaction card.

It is a further object of the invention to provide access to an additional advertising medium which is customarily carried in the pocket, wallet or purse of nearly every consumer in the United States.

It is yet another object of this invention to provide an advertising method which focuses specific advertising material to a preselected market segment in a one-on-one manner.

These and other objects are realized in a method for displaying advertising materials to a potential purchaser coincident with the making of a financial transaction by the purchaser. The method comprises the steps of a) identifying a group of purchasers having a common interest in a particular market; b) selecting a group of businesses which desire to access the group of purchasers for advertising purposes; c) producing at least one transaction recording card having a format for making a record of a financial transaction associated with the purchaser; d) placing the advertising material on the recording card in a format which may be viewed by the purchaser at a time and place of making the record of the financial transaction, the advertising material being representative of at least one business selected from the group of businesses; and e) providing means for attachment of the transaction recording card and associated advertising material to a financial transaction card which can be carried by the purchaser.

A further embodiment allows a potential customer to continuously carry advertising information which is automatically displayed to the potential customer at a point of sale. This is represented generally by the steps of a) selecting a plurality of transaction recording cards attachable to a financial transaction card for carrying in a pocket or wallet of a purchaser, said recording cards having a format for entering transaction data occurring at the point of sale based on use of the financial transaction card; b) identifying a group of potential customers which are likely to have an interest in products and services of the third party businesses; c) placing advertising material on the recording cards which represents the third party businesses; d) assembling the plurality of recording cards in a package combining the convenience of a recording format to be used by the potential customers in tracking general financial transactions and focused advertising specifically directed to the potential customers of the third party businesses which is displayed automatically by the mere use of the transaction recording card with any purchase made by the potential customer using the attached financial transaction card; and e) distributing the package of recording cards to the group of potential customers.

Finally, the present disclosure also provides a method for displaying advertising information representing third party businesses at a point of sale between a customer and a merchant. The steps include a) attaching a transaction recording card with applied advertising information regarding a third party business to a financial transaction card, the recording card having dimensions no greater than the size of the transaction card when in an attached configuration to permit insertion within a pocket; b) inserting the attached recording card and transaction card within the pocket; c) removing the attached recording card and transaction card from the pocket for making a purchase at the point of sale while concurrently displaying the applied advertising information with a first viewing orientation; d) separating the recording card from the transaction card for processing of the transaction card for payment with respect to the purchase, while concurrently displaying the applied advertising information with a second viewing orientation; e) entering purchase data on the recording card, while concurrently displaying the applied advertising information with a third viewing orientation; f) attaching the recording card to the transaction card, while concurrently displaying the applied advertising information with a fourth viewing orientation; and g) reinserting the attached recording card and transaction card within the pocket pending further use at a future point of sale.

Other benefits and objects will be apparent to those skilled in the art in view of the following detailed description, taken in combination with the accompanying drawings.

DETAILED DESCRIPTION OF THE PREFERRED EMBODIMENTS

Figure 1:
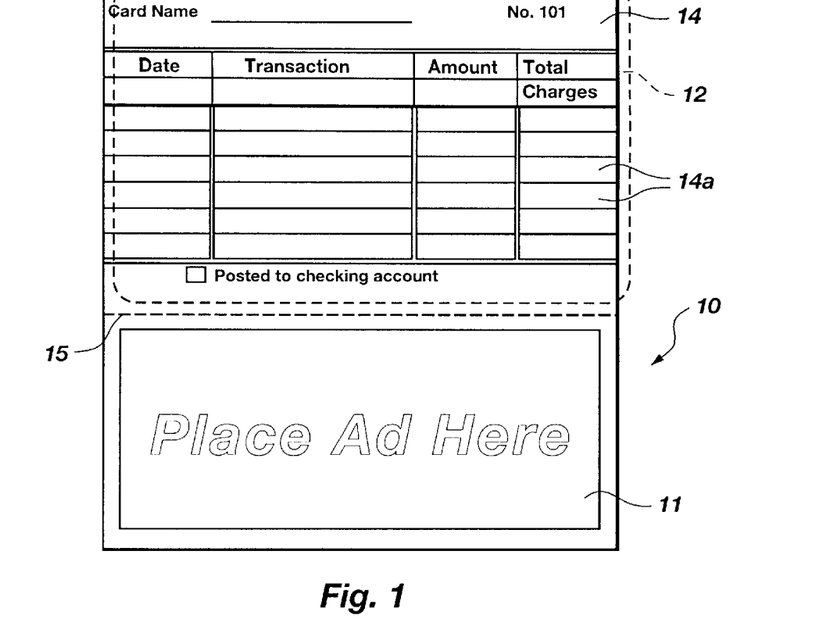
FIG. 1 shows a top, plan view of a transaction recording card implementing advertising methods in accordance with the present invention.
Figure 2:
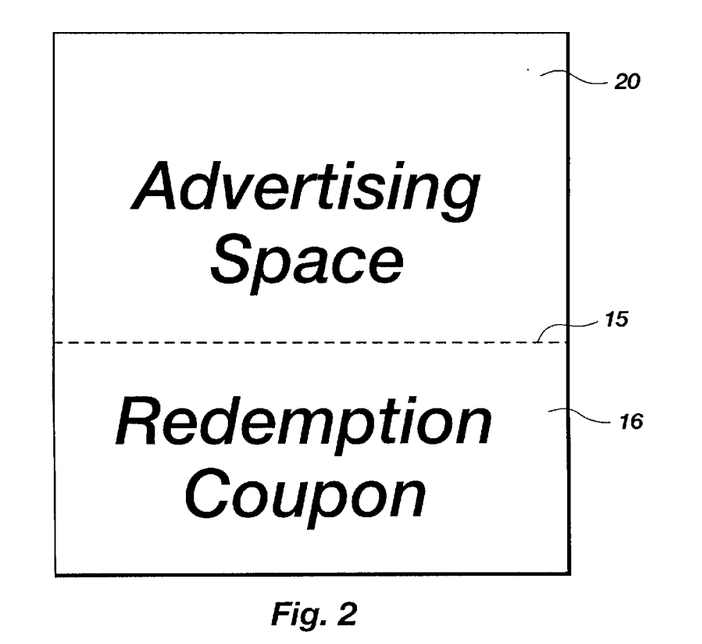
FIG. 2 shows a bottom, plan view of the card of FIG. 1.

Referring now to the drawings, FIG. 1 shows one embodiment of a recording card 10 having an advertising display 11 which automatically provides a hands-on, one-on-one exposure of promotional material which may be selected to fulfill many different advertising purposes. It places the advertising material 11 in front of a selected customer at the very point in time that a purchase is being made. In other words, the mentality of the customer is (i) in the process of making a purchase decision, (ii) placing value on a purchased product or service, or (iii) following through with a purchase to a completed transaction. Generally, these states of mind are positive, having resolved action to spend money for something which has caught the attention of the customer.

One of the fundamental principles of advertising is to develop a favorable mental state within a customer at the same time that the customer has mental and visual contact with the trademarks and product advertising of the business. This positive mental conditioning has been shown to favorably influence later purchase decisions regarding products or services of that business. Furthermore, by displaying third party advertising to the customer at this point of purchase, the customer is associating purchase activity and the making a purchase decision with the business name and advertising material 11 attached to the credit or debit card 12. By repetitively seeing advertising material while making such purchase transactions, the customer is associating a positive decision process with the advertising image displayed before them on the recording card 10. Theoretically, a future situation involving the customer in a choice with respect to purchasing the business's products will generate the previous favorable emotional state associated with the advertising material 11 and enhance the customer's disposition to make a purchase decision.

The repetitive nature of advertising exposure arises from the repeated use of the credit or debit card. With each use, the customer voluntarily displays this advertising material to himself in several sequential movements. For example, when the card 12 is removed from the pocket 13 or wallet, and initial view of the advertising material occurs. When the card is rotated and the recording card is separated from the credit card, a different view develops. As the credit card is handed to the store clerk, the recording card changes hands and is again subject to inspection of advertising materials. The customer's full attention is focused on the recording card as entries are made regarding the transaction data for this purchase. Finally, the recording card is reattached to the credit card, and is returned to the pocket or wallet. Here again, this process repeats the multiple displays of the advertising material. This frequent and repeated display of selected advertising information is an extreme contrast to a one-time, passing glance of a customer to an ad in a newspaper or magazine.

Not only is the material viewed repeatedly by the user, but it is also exposed to surrounding customers and attending clerks participating in the transaction. This further extends advertising impact using the present system. The physical activity of the customer entering transaction data at the very point of purchase associated with a credit or debit card has a tendency to draw attention of other customers in the area, as well as the clerk. Accordingly, the advertising information is inherently in view. Indeed, the present invention offers a surprising and unique timing opportunity in which the customer automatically activates the advertising exposure by simply making a purchase. The customer is virtually placing the advertising material on a form of "money" that will be used to make the purchase.

The value of this method of advertising can be appreciated when compared with the billions of dollars spent in conventional advertising media in an attempt to develop product name association with potential customers. For example, a thirty second advertisement associated with the Superbowl® annual sports event may be valued at as much as one million dollars. Although this offers massive numbers as viewers, the advertising material is displayed once to persons who may be angry, frustrated, distracted, and certainly not in a commercial frame of mind. Similarly, millions of dollars are invested in billboards which momentarily interact with motorists having little interest in a commercial transaction. Newspapers and magazines account for tremendous volumes of advertising expense, yet they offer no assurance of any favorable state of mind for the potential viewing customers. Direct mail is a common form of advertising which is well known to be very ineffective. Indeed, the mind set of persons reviewing direct mail is represented by the colloquial expression of "junk" mail.

Accordingly, it is generally recognized that one of the great challenges of the advertising industry is to reach the potential customer at the right time and in the right state of mind. Few advertising programs are able to effectively capitalize on these primary criteria. Where specially tailored programs are developed for this purpose, they typically involve very high costs in order to develop the desired focus to a selected customer base.

The present invention offers the unique combination of (i) selective advertising focused to particular marketplace, (ii) targeting of preselected persons based on any desirable profile for a potential customer, (iii) very inexpensive advertising costs in materials and distribution, (iv) exposure of the advertising materials to the customers at a point of purchase, in which the mind set involves a positive frame of mind founded on commercial decision to purchase a product or service, and (v) controlled repetition of such exposure to greatly enhance name recognition.

The unexpected union of these favorable features was a result of the uncommon observation that it is possible to attach advertising to a cash-equivalent medium. Those skilled in the art will appreciate that this observation is inconsistent with centuries of commercial practice in which advertising material was simply deemed "nonattachable" to currency. Even today, one does not naturally consider currency as a practical advertising medium. This paradigm has apparently been automatically carried over to the realm of debit and credit cards as a substitute for cash.

The present invention is represented by a foldable paper or card 10 which bears a recording format 14 which permits entry of each purchase transaction based on date, price, store, etc. The consumer is able to maintain an ongoing record of purchases with respect to each credit or debit card, thereby enabling monitoring of ongoing balances and other relevant product information which can be easily reconciled against a monthly statement. This can also avoid the embarrassment of insufficient funds or excessive credit. Debit card use is particularly vulnerable because they draw directly against a fixed bank account balance. When this balance is exceeded, the card will be rejected. Whereas, customary monitoring tools for debit/credit cards are bulky and cumbersome, the present invention provides a convenient and simple format for control, as well as an incentive for the user to carry the accompanying advertising medium 11 which will be displayed with each transaction. Indeed, the view or display of advertising material is a natural by-product of handing the card to the cashier or attendant in order to make the purchase.

When viewed from the above perspective, the convenience of attachment to the debit and nature of use of the recording card offers an ideal medium for placement of advertising material. Accordingly, the present invention involves display of preselected advertising names, logos, and other materials in combination with a transaction recording card format. The advertising information is placed on open space as advertising medium 11 on the recording card at a desired location. With this general observation in place, many variables exist for content and configuration for the advertising materials.

Figure 11:
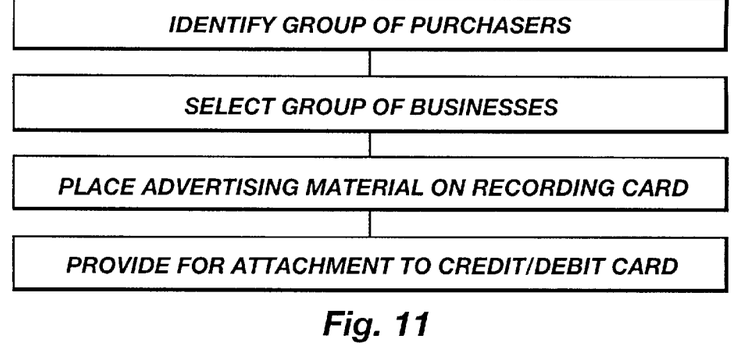
FIGS. 11, 12, and 13 provide block diagrams of various advertising methods embodying the present invention.

Many procedures can be implemented to effectively develop the subject advertising methodology. In one embodiment represented as a flow chart in FIG. 11, this process begins by identifying a group of purchasers having a common interest in a particular market. Libraries of information and demographics exist which enable effective selection of almost any group of purchasers, whether it be by age, education, job profile, family size, location, income level, etc. This identified group of persons now becomes a market representing its own value. With knowledge of this group and their interests, the advertising businesses can tailor specific advertising materials which are focused for their needs and interests.

The next step is to select a group of businesses which desire to access this group of purchasers for advertising purposes. Typically, these businesses will be targeted because they supply products of interest. These businesses generally have advertising budgets which will be expended in many advertising media, including many which are less focused and unpredictable than the present invention. Use of debit or credit cards as a medium for advertising formats enables production of transaction recording cards which can be tailored to efficient and focused advertising. In addition, it provides the advantage of facilitating accountability and financial responsibility with respect to consumer use of the credit and debit cards. Therefore, advertising can now be implemented in a highly effective media with very little cost and can fulfill a public interest as well.

Accordingly the advertising business may place the advertising material on the recording card in a format which may be viewed by the purchaser at a time and place of making the record of the financial transaction. The advertising material will obviously be representative of at least one of the businesses identified as part of a common group of business interests. These businesses can then be approached using focused advertising to be placed on recording cards which will then be distributed to the identified customers.

The use of credit or debit cards as a general advertising media must be contrasted with owner or sponsor advertising on prior art cards wherein advertising merely identifies the sponsor of the financial card. Such conventional advertising identification is usually in the form of a trademark or service mark which is applied by the bank or other sponsor of the credit or debit card. This form of owner or "first-party" advertisement is not of the same category or nature of third party advertising which is applied to independent media other than its own products or services. First-party advertising, as used herein, relates to linking name recognition to the supplying or sponsoring party's product. This practice is common wherein a company sells a product and puts its name and trademark on the product to identify its manufacturing source. In view of its proprietary interests, the company usually does not allow third party advertising to be placed on its product. As a result of this common practice, there is not a commercial expectation that a given company's product packaging is available as a commercial medium for third party advertising. Similarly, the name applied to a credit or debit card may represent a form of advertising on behalf of the card owner or sponsor, but has not been perceived as a medium for third party advertising. Indeed, commercial practice demonstrates through decades of credit and debit card use that such card advertising is generally limited to first party name recognition. Accordingly, advertising methods set forth in this disclosure distinguish third-party advertising as a unique and distinctive arena from first-party or owner advertising.

The present invention involving a transaction recording card discloses a third party advertising medium which represents a major step forward in advertising methodology, resulting in more effective advertising at greatly reduced costs. Its application for third party use is unlimited. Virtually any ad format can be applied to the folded recording card and may be directed to virtually any customer. Furthermore, this advertising medium has the advantage of serving a useful purpose for the customer by providing a data entry format, rather than merely passing advertising within the view of the potential customer and then on to the waste basket. In the present invention, the customer retains and uses the recording card for recording credit transactions with each purchase, leading to repetitive exposures. For example, each card has multiple entries 14*a* for recording purchase transactions which allow repeated use of the same recording card for as many as six to ten financial transactions. Each purchase automatically provides a repeated display of the advertising format.

Figure 3:
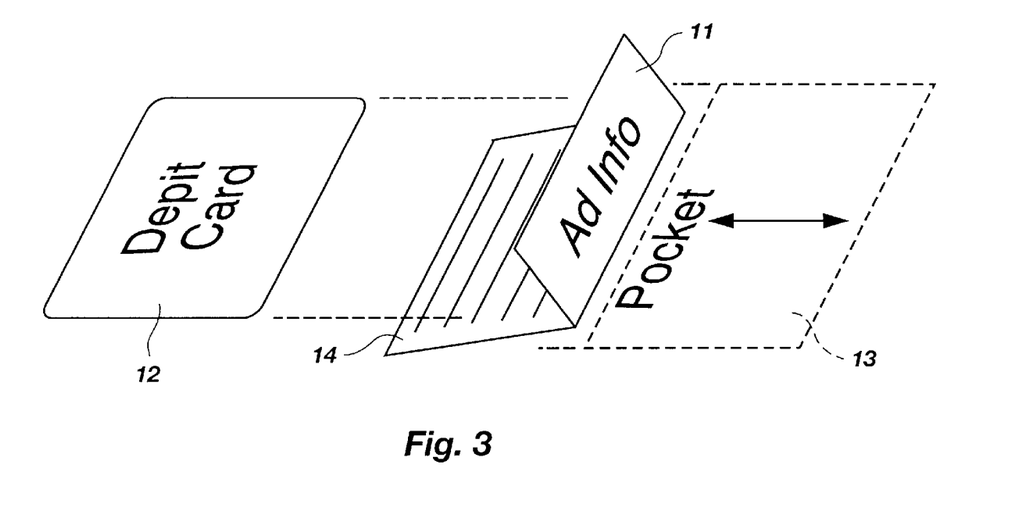
FIG. 3 depicts a transaction card separated from a financial transaction card for storage in a pocket.
Figure 4:
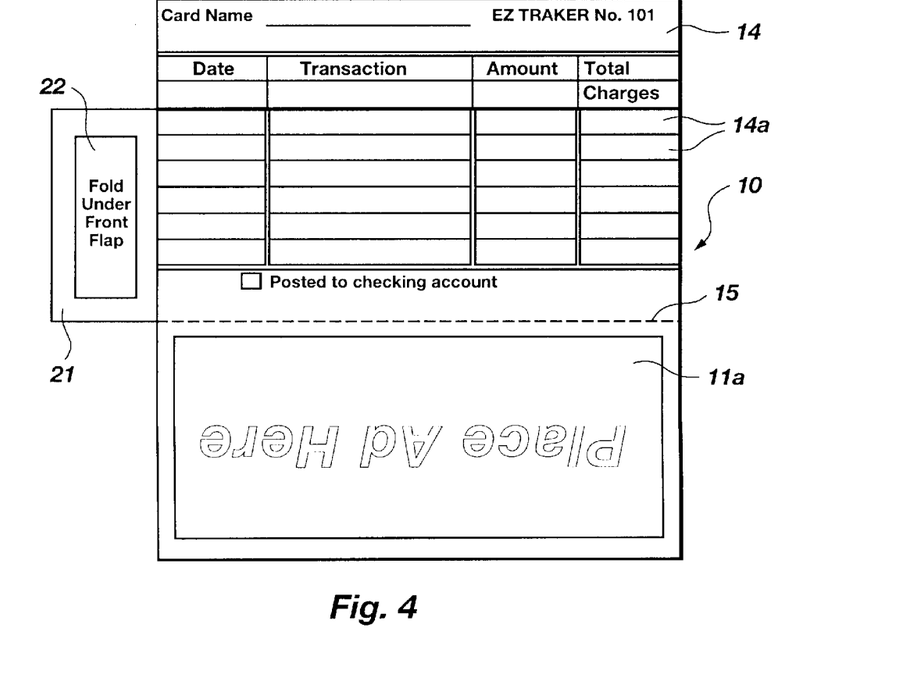
FIG. 4 illustrates an alternative configuration of a recording card having a connecting tab to secure opposing sides of the card together.

This repetitive action is facilitated by a convenient attachment of the recording card to the credit or debit card as illustrated in FIG. 3. Typically, a scored or otherwise marked fold line 15 identifies a division in the card format. The record entry portion is placed on the larger section of the card, leaving the remaining upper portion for placement of advertising information. Similarly, the back side of the card 20 can be used for third party advertising logos, trademarks, etc. A coupon 16 or other incentive may also be included as is discussed in greater detail hereafter. A foldable tab 21 may also be incorporated along one side of the card with adhesive 22 to enable formation of a preformed pocket into which the credit card may be repeatedly inserted. It will be apparent to those skilled in the art that numerous other means for attachment of the transaction recording card and associated advertising material to a financial transaction card may be implemented. In general terms, this attachment function simply enables the combined recording and transaction cards to be carried in a wallet of the purchaser without special modifications. As can be noted in FIG. 4, the advertising material 11*a* can be applied in any orientation.

As was indicated above, the record format for entering transaction data provides an incentive for the user to maintain the applied advertising material with his credit or debit card. This is a significant advantage over other forms of third party advertising which merely supply information without independent value. Indeed, any recording format which provides such a function is acceptable.

Generally, the step of producing the transaction recording card will involve printing on the recording card (i) a record format (14, 24*a,* 24*b,* 34, 44, 54, etc.) for entering purchase data representing point of sale purchase transactions and (ii) business information 11, 16, 20, 30, 40 about the third party business for concurrent viewing by persons at the point of purchase. With this combination fixed on the same piece of paper, each use of the card becomes an automatic display of advertising information. At a minimum, such information will include a company name and logo which provides a visual association of the potential purchaser with the third party business.

Because of the convenience of insertion within the pocket 13 or wallet, other options exist for many forms of advertising activity. For example, a separable coupon 16 may be included as part of the recording card for enabling the potential purchaser to redeem the coupon for additional value from the third party business. Such coupons offer a convenient and inexpensive tracking system for monitoring effectiveness of the media, as well as identification of demographics of the users. This may be accomplished by developing marketing data regarding potential purchasers based on redemption of the coupon.

Figure 7:
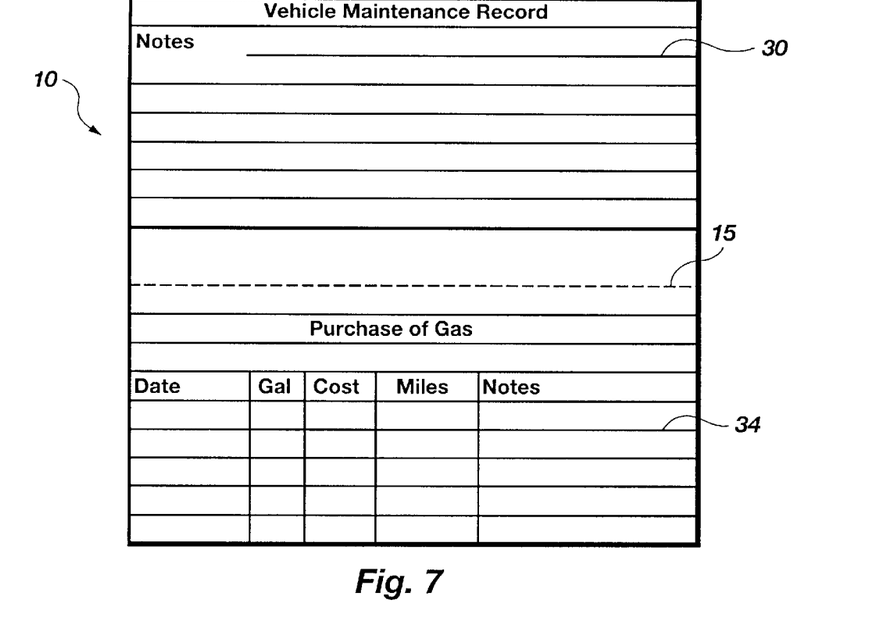
FIGS. 7, 8, 9, 10, 14 and 15 illustrate alternative data and transaction formats for recording cards useful as an advertising medium.
Figure 8:
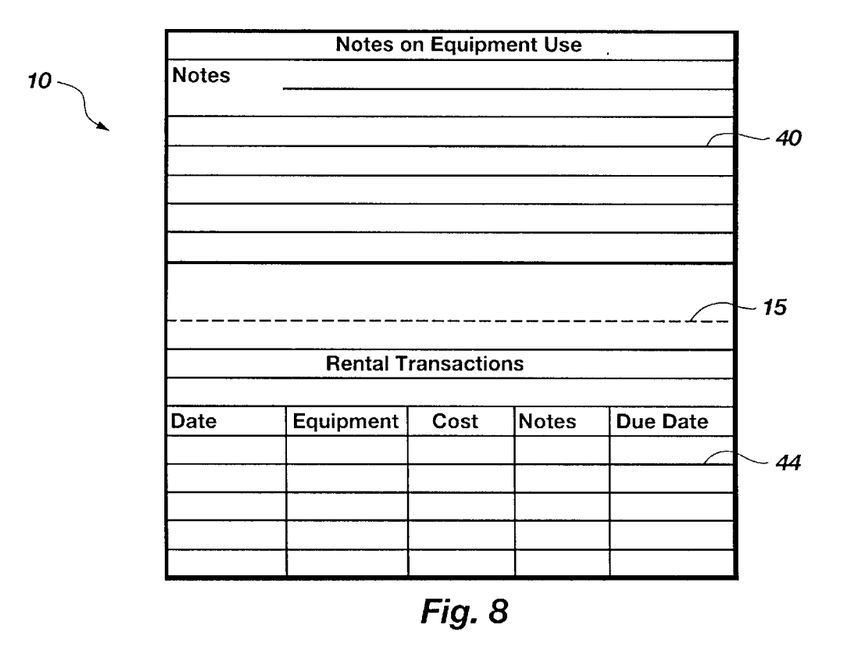
Figure 9:
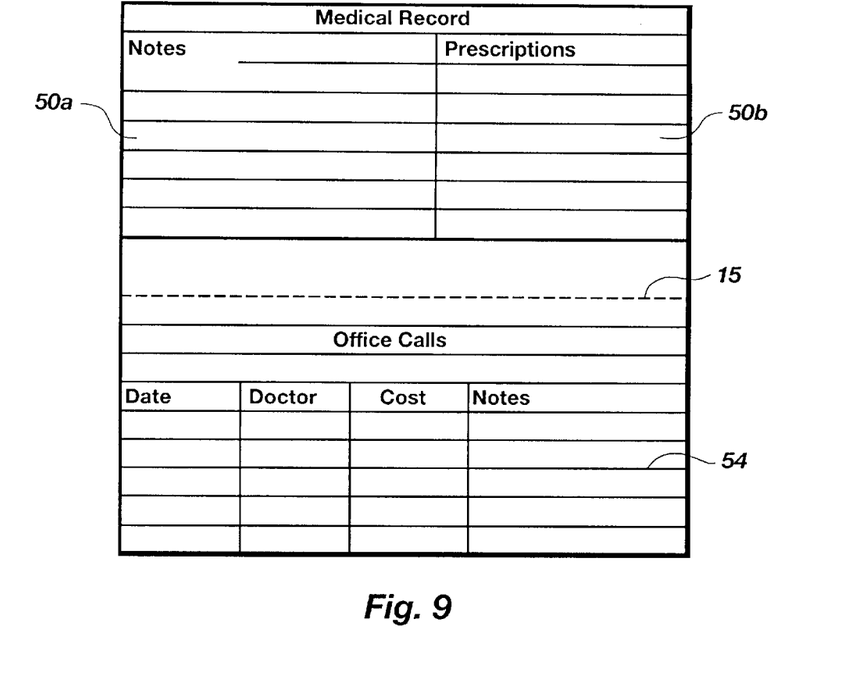
Figure 10:
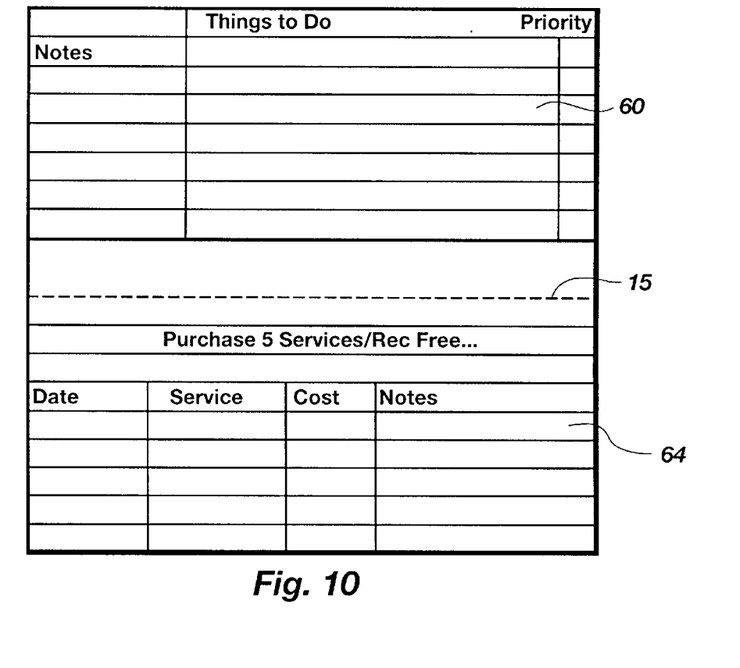

In addition to a wide selection of advertising information, the present advertising method can be expanded based on variable use with respect to other transaction recording cards such as gas cards FIG. 7, rental cards FIG. 8, health cards FIG. 9, incentive cards FIG. 10 and cash cards. Additional value may be added to the recording card by providing other useful data formats such as a calendar and appointment system 24b, shopping list section 24a as a reminder for future purchasing activity, and entry space for things-to-do 60 and other forms of reminder notes 50a for miscellaneous data. The recording format can be modified to provide space for recording sequential dates of purchase for medications 50b, or return dates for library books and movie rentals as in FIG. 8. It will be apparent that many data forms may be used in combination with the advertising format, provided the incentive for use is at least partly motivated by a transaction card which is typically carried in the wallet. For the sake of simplicity, such cards are generally referred to herein as "financial recording cards."

The advertising method of the present invention can also be viewed from the perspective of a targeted group of customers, as opposed to an identified class of third party businesses. A method wherein the general inventive steps involve selecting a plurality of transaction recording cards attachable to a financial transaction card wherein the group of potential customers are likely to have a common interest in products and services of the third party businesses. For example, credit cards issued by oil companies define a customer base which share the common interest of purchasing fuel and automotive maintenance supplies. The focused advertising to this group of customers is greatly facilitated with the attachment of a recording card which includes entry space for business expenses and mileage records FIG. 7 as part of the card format. Such records offer tax advantage because they are automatically made at the time of purchase, and are already in the hand of the user by virtue of using the credit card to effect the purchase transaction. Other selections for customer grouping is virtually endless. Consumer classes are well defined within the industry, and in most cases, mailing lists already exist. Such groupings include music club memberships, sports groups, subscribers to magazines and trade journals, charitable and community organizations, political party affiliations, hobby clubs, etc. Each of these groups have identified consumer interests which may be uniquely targeted by virtue of selective mailing of recording cards having tailored advertising information.

Figure 5:
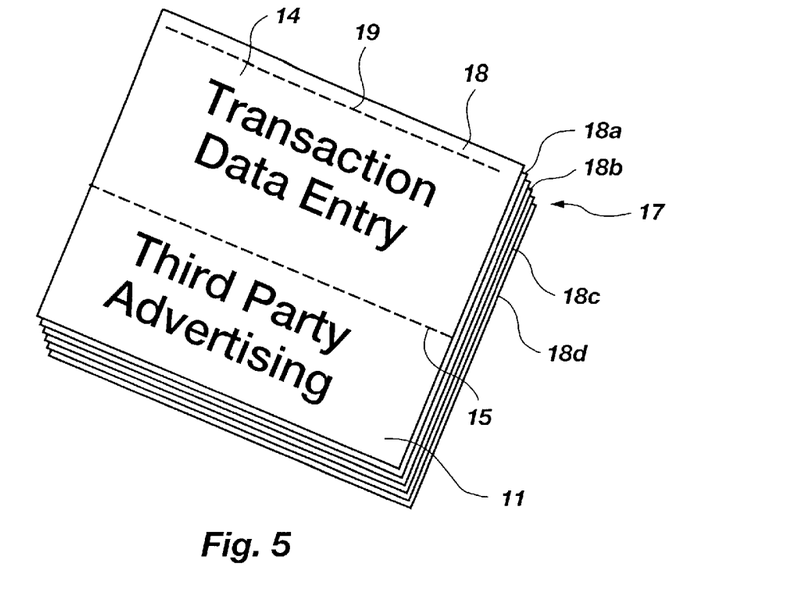
FIG. 5 graphically shows an end-bound or padded stack of recording cards representing advertising positions of differing priority.
Figure 6:
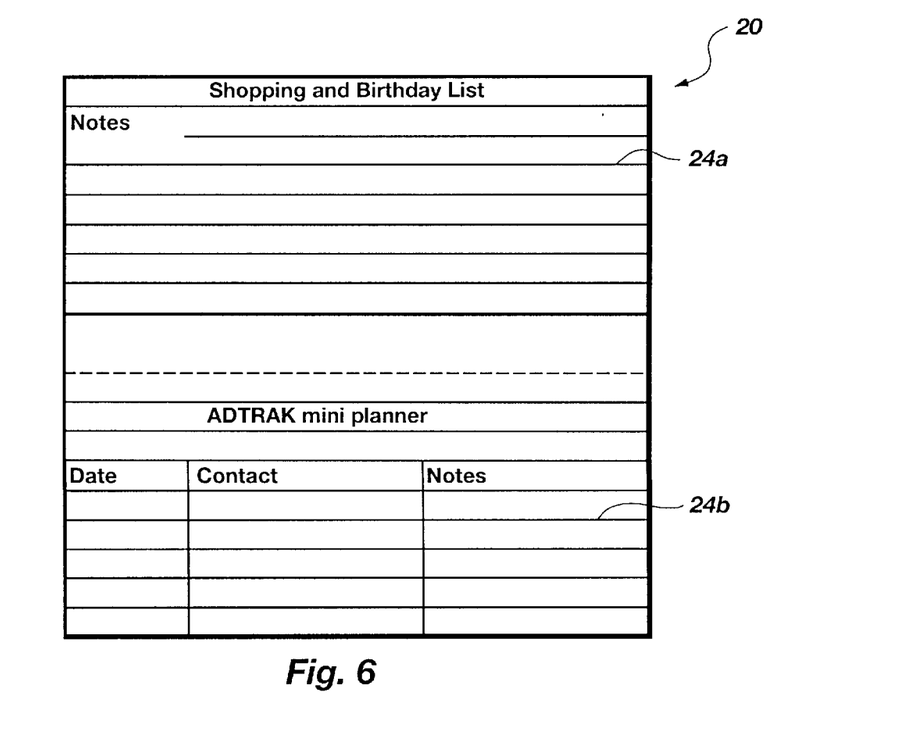
FIG. 6 illustrates one embodiment of note and data formats for use with the present invention.
Figure 12:
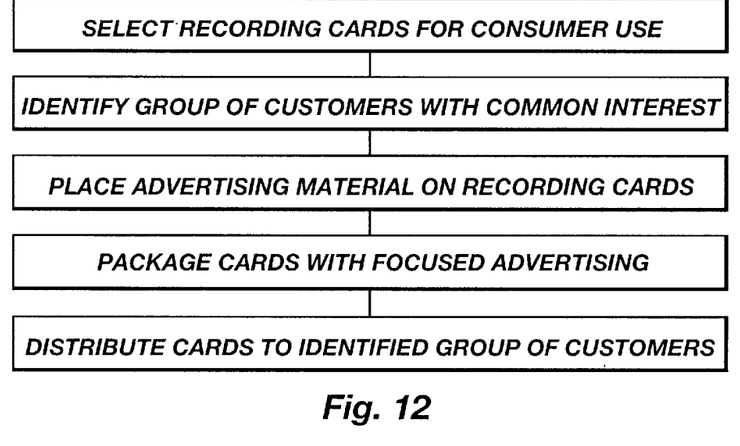

Third party businesses can be grouped as well, with selected advertising representing each member of the business group being placed on an end-bound or a padded stack of recording cards 17 (FIG. 5) provided to a single user. Many adhesives 19 are available to attach the respective cards in a removable stacked configuration. The formal steps embodying this procedure are also represented in FIG. 12 and would include assembling the plurality of recording cards in a package having several different third party businesses which collectively sponsor distribution of the package to their shared customer base. This provides the benefit of reduced cost by shared mailing expense, as well as access to a larger customer base for demographic follow up and analysis. Priority positions can be identified on respective recording cards based on potential advertising exposure, with differential pricing being assigned based on different commercial value to the respective priority positions. Obviously, a card 18 on top of the stack of cards will be more likely to be used or removed than one on the bottom 18a, b, c or d. Accordingly, advertising costs associated with an ad placed on the top card of the pad would be priced higher than lower positions. This general step of assigning priority positions to the sequence of recordings cards which form the package is a unique feature of the present advertising system. Advertisers would select a priority position based on their budget and advertising objectives. Typically, the most expensive advertising would be assigned to a first recording card 18 placed at a top position in the package and lower positions 18a, b, c, d would receive successively lesser value. Accordingly, the present invention offers a new commercial transaction method for marketing advertising space which is more predictable in probability of exposure than many other forms of differential pricing.

Figure 13:
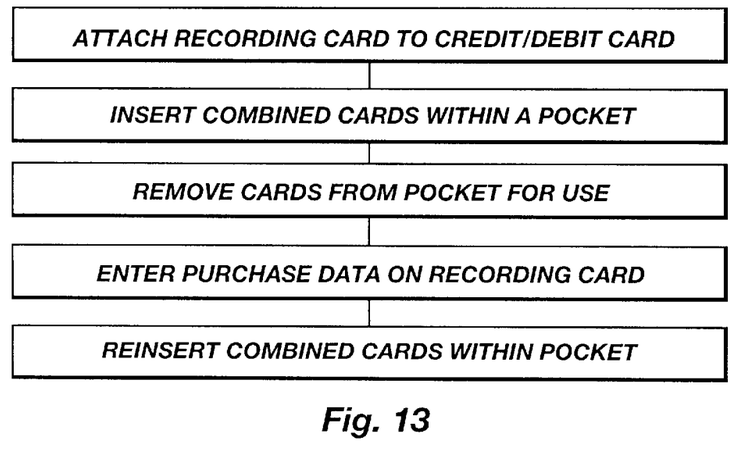
Figure 14:
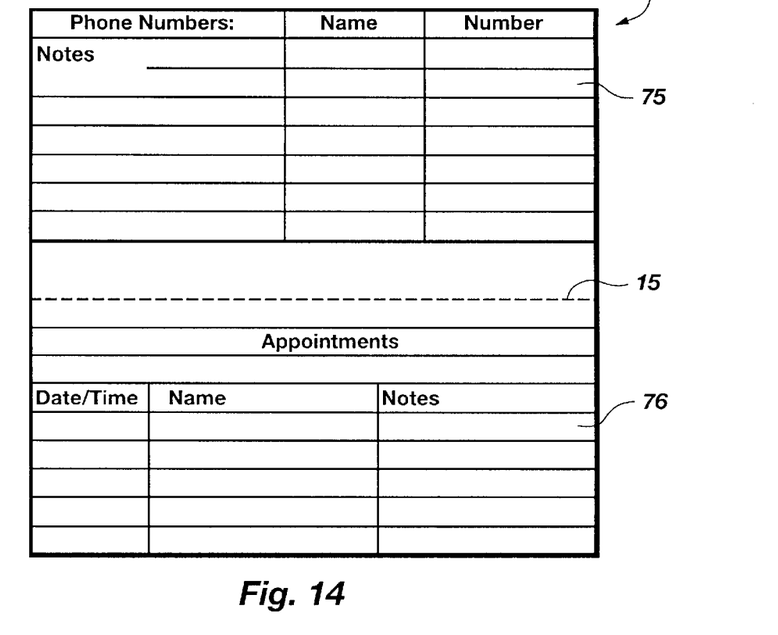

Finally, the present invention provides a unique advertising perspective to the customer, illustrated in FIG. 13, involving a basic ritual which is followed when completing a credit or debit card transaction. The inventive method involves the steps of:

a) attaching a transaction recording card with applied advertising information regarding a third party business to a financial transaction card. This step is facilitated by using a recording card having substantially common dimensions with the transaction card when in an attached configuration to permit insertion of the card within a card pocket. The combination adds little weight or volume, yet offers the convenience of having accessible data entry sheets, as well as a media for display of advertising materials;

b) inserting the attached recording card and transaction card within the pocket so that it is carried on the person as part of daily activity;

c) removing the attached recording card and transaction card from the pocket for making a purchase at the point of sale while concurrently displaying the applied advertising information with at least one first viewing orientation. Obviously, there are an infinite number of orientations which cold be assumed at this stage of display. The common aspect of each orientation is that the recording card and credit card are still attached, having a somewhat limited exposure of only one side of the advertising surface.

d) separating the recording card from the transaction card for processing of the transaction card for payment with respect to the purchase, while concurrently displaying the applied advertising information with a second viewing orientation. This is often a necessary step in order to slide or expose the magnetic strip of the card for optical or electronic scanning. Obviously, smart card devices 12 which have embedded integrated chips may be inductively scanned, eliminating the need for separation of the recording card. In this case, this step would be modified by exposing the combined recording and transactions cards in readable access to a transaction processor;

e) entering purchase data on the recording card, while concurrently displaying the applied advertising information with a third viewing orientation. Typically, the person will make written entries of purchase data, or other relevant information. With more advanced electronic or optical interface, this data entry may be accomplished in an automated manner. Both methods of data entry are contemplated with this step of the process.

f) attaching the recording card to the transaction card (FIG. 3) while concurrently displaying the applied advertising information with a fourth viewing orientation. Here again, automated entry systems or inductive scanning devices may bypass this step;

g) reinstating the attached recording card and transaction card within the pocket pending further use at a future point of sale.

The advantages of this procedure as an advertising medium include the following. First, the process is an activity which the customer habitually performs without thought. Therefore, there is no training required to display the advertising material. It happens with or without the customer intent. Because our mind is continuously monitoring the surrounding environment, it automatically registers the advertising material, at least at the subconscious level. Therefore, each movement which creates a different angle of viewing, a different position in the hand, a different movement of the arm—each of these activities is an event recorded by the mind.

At the same time, the mind is linking into the customer's emotional feelings of making a purchase decision. Typically, people buy after they have resolved the issues of expense, quality and need. The emotional state that follows is one of satisfaction and reconciliation that this action is in the best interest of the customer. Therefore, the attendant psychology of the mind is very favorable to the desired mental state which a business desires to access and link with advertising and promotional material. The resulting mental and emotional connection includes a sense of satisfying fulfilment associated with visual connection to the third party business logo, trademark or other advertising material. Consequently, the next time the customer sees the advertising material, such as standing in front of a counter with many competitive products, the third party trademark will stand out, being linked with a previous favorable emotional feeling, accompanied with the mental state of having made a purchase decision. The repetitive exposure generated through the present invention greatly contributes to a natural decision response wherein the person will select the advertised product over other brands which are not linked to prior favorable conditions.

This emotional influence can be supplemented and reinforced by giving the customer additional value at the point of purchase. For example, the recording card may include a coupon 16 or other authorization for a discount 64 (FIG. 10) or redemption option. As the customer receives a specific benefit for displaying the advertising material on his recording card, the favorable emotional state is enhanced, creating an even stronger benefit form this simple purchase activity. As has been mentioned, the separable coupon 16 associated with the recording card may serve as a tracking device for monitoring use of the recording card within different markets and by different customers. This data can help focus future use of materials in the most effective markets.

Figure 15:
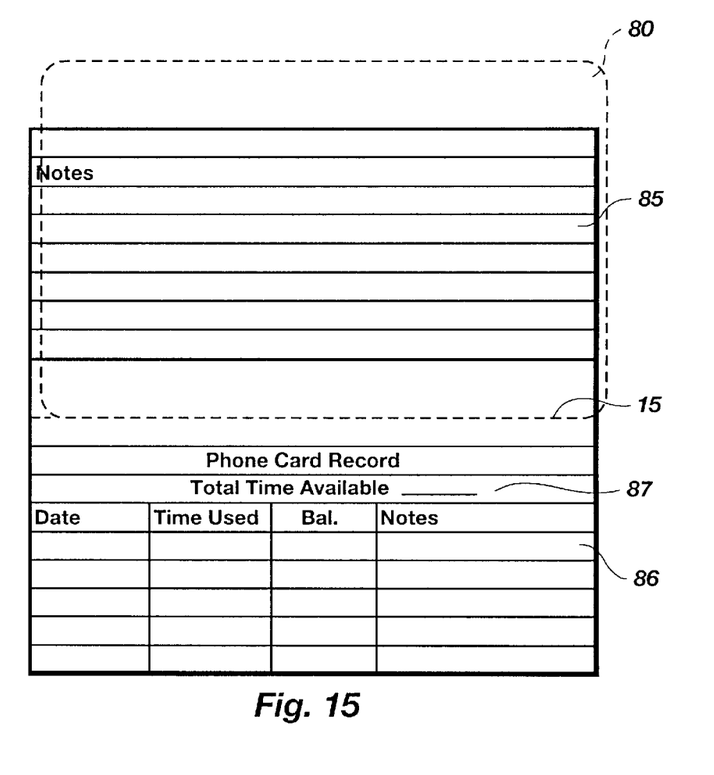

It will be apparent to those skilled in the art that this advertising medium offers many applications which constitute a new medium of repetitive exposure for advertising materials. For example, the recording card may include a phone number index 75 and/or an appointment format 76. Furthermore the system may be used with a phone card 80 having long distance calling credit as shown in FIG. 15. The transaction entry format 86 enables an ongoing record of use charged against the total time available 87 on the card. Advertising space is available on the back of the card, or in place of the note section 85. Accordingly, the illustrations of this disclosure are not intended to be limiting, but merely exemplary of several preferred embodiments of the invention.

We claim:

1. A method for displaying advertising materials to a potential purchaser coincident with the potential making of a financial transaction by the purchaser, the method comprising the steps of:

a) identifying a group of purchasers having a common interest in a particular market;
   b) selecting a group of businesses which desire to access the group of purchasers for advertising purposes;
   c) producing at least one transaction recording card having a format for making a record of a financial transaction associated with the purchaser;
   d) placing the advertising material on the recording card in a format which may be viewed by the purchaser at a time and place of making the record of the financial transaction, said advertising material being representative of at least one business selected from the group of businesses; and
   e) providing means for attachment of the transaction recording card and associated advertising material to a financial transaction card which can be carried by the purchaser.

2. A method as defined in claim 1, wherein the step of producing the transaction recording card comprises the more specific steps of printing on the recording card (i) a record format for entering purchase data representing point of sale purchase transactions and (ii) business information about a third party business for concurrent viewing by persons at the point of purchase.

3. A method as defined in claim 2, comprising the more specific step of printing business information which includes a company name and logo which provides a visual association of the purchaser with the third party business.

4. A method as defined in claim 2, further comprising the step of providing a separable coupon as part of the recording card for enabling the potential purchaser to redeem the separable coupon for additional value from the third party business.

5. A method as defined in claim 4, further comprising the step of developing marketing and demographic data regarding potential purchasers based on redemption of the coupon.

6. A method as defined in claim 1, wherein the step of producing the at least one transaction recording card includes the step of preparing a format for making a record of financial transactions associated with a card selected from the group consisting of credit cards, debit cards, smart cards, phone cards, gas cards, cash cards, incentive cards, and health cards.

7. A method as defined in claim 1, wherein the step of producing the at least one transaction recording card includes the step of preparing a format for entering data associated with a calendar and appointment system.

8. A method as defined in claim 1, wherein the step of producing the at least one transaction recording card includes the step of preparing a format for entering shopping list items as a reminder for future purchasing activity.

9. A method as defined in claim 1, wherein the step of producing the at least one transaction recording card includes the step of preparing a format for entering reminder notes.

10. A method as defined in claim 1, wherein the step of providing means for attachment comprises the more specific step of providing identification of a folding line for folding the recording card against itself to form a pocket for insertion of the transaction card within the recording card.

11. A method for advertising on behalf of third party businesses which allows a potential customer to continuously carry advertising information which is automatically displayed to the potential customer at a point of sale, said method comprising the steps of:
   a) selecting a plurality of transaction recording cards attachable to a financial transaction card for carrying in a pocket of a purchaser, said recording cards having a format for entering transaction data occurring at the point of sale based on use of the financial transaction card;
   b) identifying a group of potential customers which are likely to have an interest in products and services of the third party businesses;
   c) placing advertising material on the recording cards which represents the third party businesses;
   d) assembling the plurality of recording cards in a package combining the convenience of (i) a recording format to be used by the potential customers in making general financial transactions, said format providing the potential customers with an incentive to regularly carry and use the recording cards, and (ii) focused advertising specifically directed to the potential customers of the third party businesses which is displayed automatically by the mere use of the transaction recording card with any purchase made by the potential customer using the attached financial transaction card; and
   e) distributing the package of recording cards to the group of potential customers.

12. A method as defined in claim 11, wherein the step of placing advertising material on the recording cards comprises the more specific step of selecting priority positions on respective recording cards based on potential advertising exposure and assigning different commercial value to the respective priority positions.

13. A method as defined in claim 12, wherein the step of assembling the plurality of recording cards in a package includes the step of assigning priority positions to a sequence of recordings cards which form the package, a highest priority position being assigned to a first recording card placed at a top position in the package and lower positions receiving successively lesser value.

14. A method as defined in claim 11, wherein the step of placing advertising material on the recording cards comprises the more specific step of printing businesses information which includes a company name and logo for providing visual association of the potential customers with the third party business.

15. A method as defined in claim 11, further comprising the step of providing a separable coupon as part of the recording card for enabling the potential purchaser to redeem the coupon for additional value from the third party businesses.

16. A method as defined in claim 11, wherein the step of selecting the transaction recording cards includes the step of preparing a format for making a record of financial transaction associated with a card selected from the group consisting of credit cards, debit cards, smart cards, phone cards, gas cards, incentive cards, cash cards and health cards.

17. A method for displaying advertising information representing third party businesses at a point of sale between a customer and a merchant, said method comprising the steps of:
   a) attaching a transaction recording card with applied advertising information regarding a third party business to a financial transaction card, said recording card having substantially common dimensions with the transaction card when in an attached configuration to permit insertion within a card pocket;
   b) inserting the attached recording card and transaction card within the pocket;
   c) removing the attached recording card and transaction card from the pocket for making a purchase at the point of sale while concurrently displaying the applied advertising information with a first viewing orientation;
   d) separating the recording card from the transaction card for processing of the transaction card for payment with respect to the purchase, while concurrently displaying the applied advertising information with a second viewing orientation;
   e) entering purchase data on the recording card, while concurrently displaying the applied advertising information with a third viewing orientation;
   f) attaching the recording card to the transaction card, while concurrently displaying the applied advertising information with a fourth viewing orientation;
   g) reinserting the attached recording card and transaction card within the pocket pending further use at a future point of sale.

18. A method as defined in claim 17, wherein the step of attaching a transaction recording card includes the step of selecting a recording card having advertising material including a company name and logo which provides visual association of the potential customer with the third party business.

19. A method as defined in claim 17, further comprising the step of removing a separable coupon from the recording card for enabling the potential purchaser to redeem the coupon for additional value from the third party business.

20. A method as defined in claim 17, wherein the step of attaching the transaction recording cards comprises the more specific step of attaching the recording card to a financial transaction card selected from the group consisting of credit cards, debit cards, smart cards, phone cards, gas cards, rental cards, incentive cards, health cards and cash cards.

21. A method for displaying advertising information representing third party businesses at a point of sale between a customer and a merchant, said method comprising the steps of;
   a) attaching a transaction recording card with applied advertising information regarding a third party business to a financial transaction card, said recording card having width dimensions no larger than the transaction card when in an attached configuration to permit insertion within a card pocket;
   b) inserting the attached recording card and transaction card within the pocket;
   c) removing the attached recording card and transaction card from the pocket for making a purchase at the point of sale while concurrently displaying the applied advertising information with a first viewing orientation;
   d) processing the transaction card for payment with respect to the purchase, while concurrently displaying the applied advertising information with a second viewing orientation;
   e) entering purchase data on the recording card, while concurrently displaying the applied advertising information with a third viewing orientation; and f) reinserting the attached recording card and transaction card within the pocket pending further use at a future point of sale.

22. A device for displaying third party advertising materials to a potential purchaser, as well as to other persons in immediate vicinity, coincident with making a financial transaction by the purchaser, the device comprising:

at least one transaction recording card sized to attach to and conform to dimensions of a standard credit or debit card and having a format for making a record of a transaction associated with the purchaser;

third party advertising material placed on the recording card in a format which may be viewed by the purchaser at a time and place of making the record of the transaction, said advertising material being representative of at least one business which has no association with a sponsor or supplier of the credit or debit card; and means for attachment of the transaction recording card and associated advertising material to a transaction card which can be carried by the purchaser.

23. A device as defined in claim 22, further comprising a separable coupon as part of the recording card for enabling the potential purchaser to redeem the coupon for additional value.

24. A device defined in claim 22, wherein the at least one transaction recording card includes a format for making a record of transactions associated with a transaction card selected from the group consisting of credit cards, debit cards, smart cards, phone cards, gas cards, cash cards, incentive cards, and health cards.

25. A device as defined in claim 24, further comprising a transaction card removably attached to the recording card.

26. A device as defined in claim 22, further comprising and assembly of recording cards in a package combining the convenience of (i) a recording format to be used by the potential customers in making general financial transactions, said format providing the potential customers with an incentive to regularly carry and use the recording cards, and (ii) focused advertising specifically directed to the potential customers of the third party businesses which is displayed automatically by the mere use of the transaction recording card with any purchase made by the potential customer using the attached financial transaction card.

27. A device as defined in claim 26, wherein the assembly of recording cards are stacked in differing priority positions based on potential advertising exposure defining different commercial advertising value.

28. A device as defined in claim 27, wherein the assembly of recording cards comprise a stack of cards having advertising priority positions according to a sequence with a highest priority position being assigned to a first recording card placed at a top position in the stack of cards and lower positions having successively lesser value.

* * * * *